Figure 1:
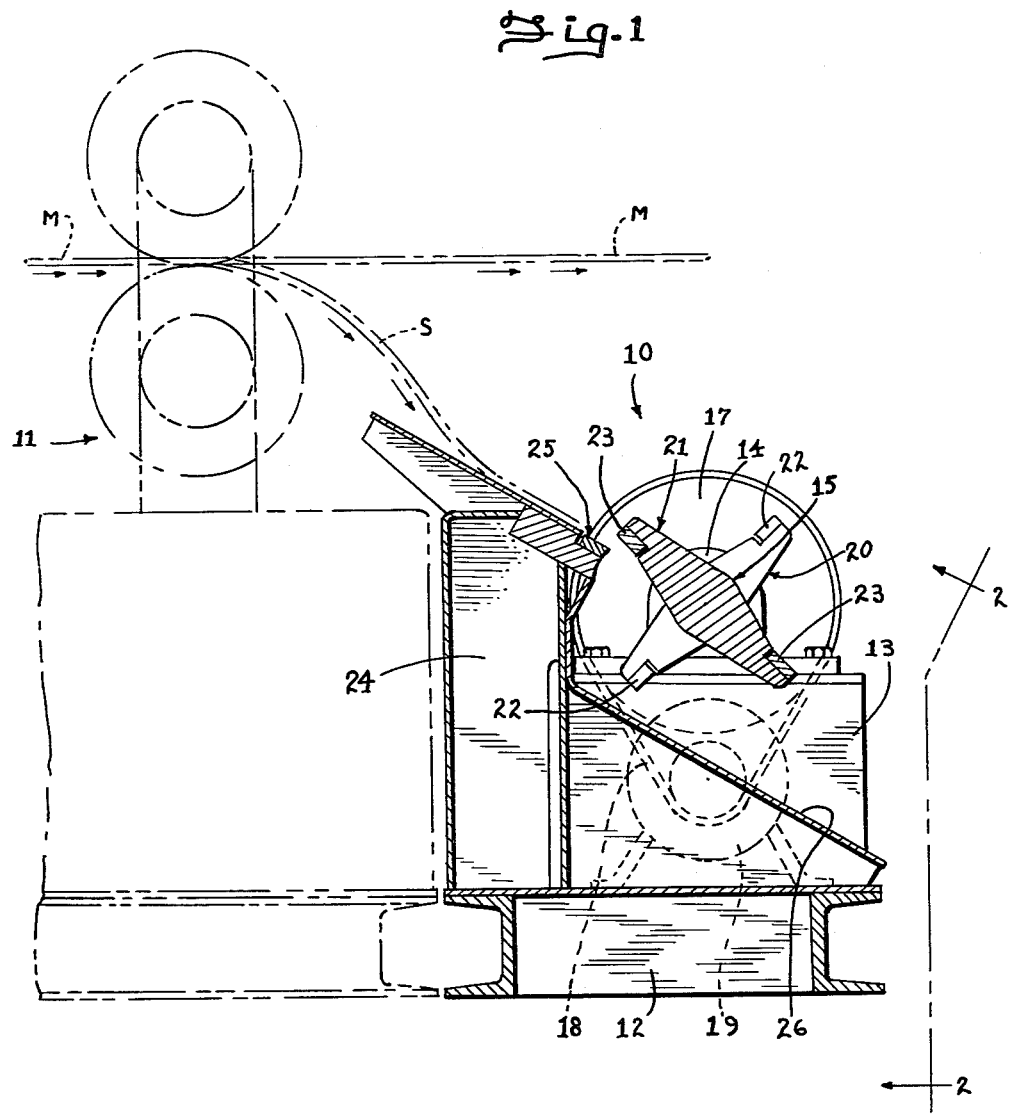

Oct. 30, 1962 L. A. KARBER 3,060,778
CUTTING DEVICE
Filed Sept. 8, 1958 4 Sheets-Sheet 3

INVENTOR.
LEONARD A. KARBER
BY
ATTORNEY

Oct. 30, 1962  L. A. KARBER  3,060,778
CUTTING DEVICE
Filed Sept. 8, 1958  4 Sheets-Sheet 4
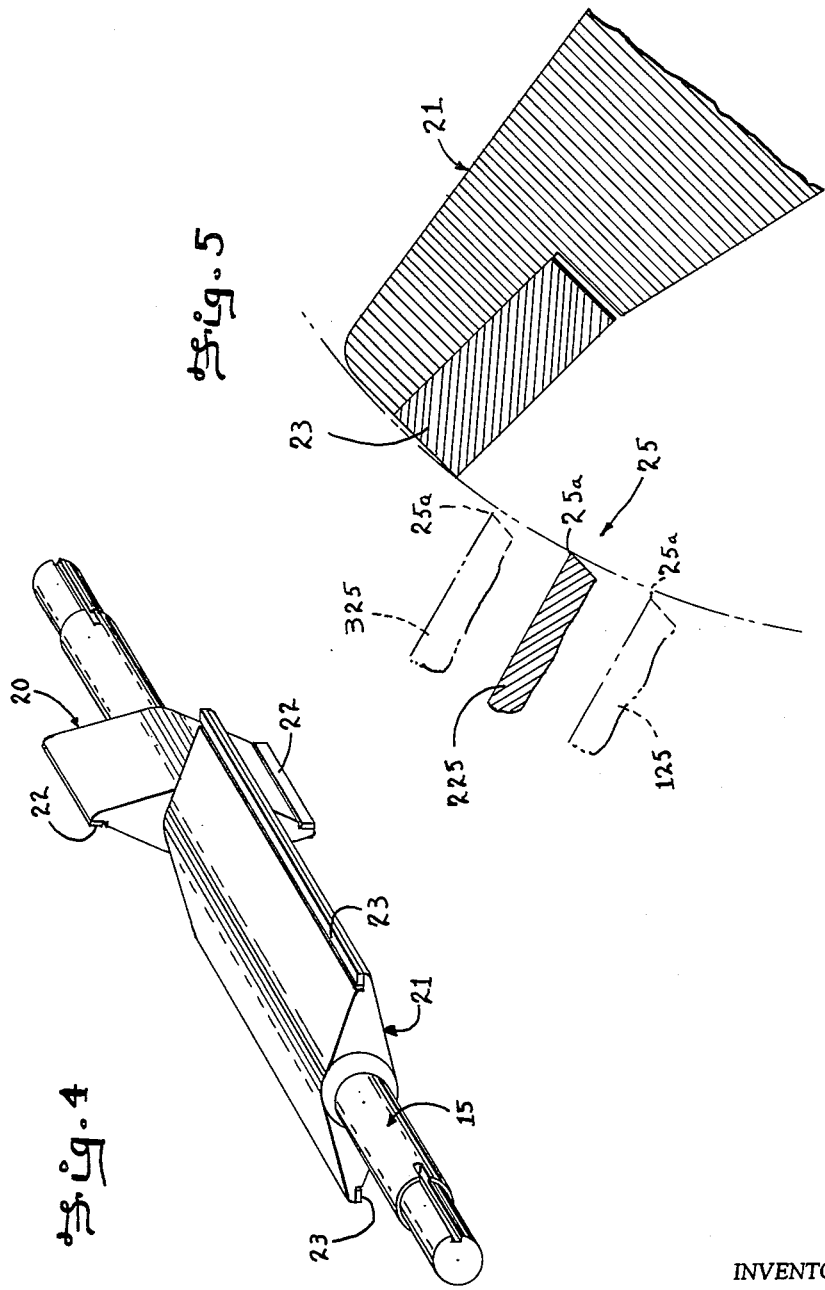
INVENTOR.
LEONARD A. KARBER
BY
ATTORNEY 3,060,778
CUTTING DEVICE
Leonard A. Karber, Sharon, Pa., assignor to
Herr Equipment Corporation
Filed Sept. 8, 1958, Ser. No. 759,571
2 Claims. (Cl. 83—355)

The present invention relates to a cutting device, more particularly to a device of the type for cutting elongated pieces of scrap material into relatively short pieces which are easily handled, and the principal object of the invention is to provide new and improved cutting devices of such character.

Generally speaking, scrap cutting devices, or scrap choppers as they are sometimes called, have long been known. These devices have includes a fixed blade and a rotatably mounted blade between which the scrap to be cut was fed. These prior art devices, while more or less satisfactory in certain respects, possessed some serious disabilities.

One of the most formidable problems presented in the design of scrap choppers is that of controlling the shock which results each time the blades sever the piece of scrap. While it has long been recognized that this shock can be reduced by causing the cutting blades to pass each other at an angle so that a shearing action takes place, in practice it has been difficult to do this with certain scrap chopper designs.

In the past, it has been thought that the only way a scrap chopper of the general type having a rotating knife extending longitudinally of its axis of rotation could be arranged to provide for the desired angularity between the rotating knife and the fixed knife, was to employ knives either one or both of which were curved. This solution has not been acceptable because of the difficulty of manufacturing blades of this type and the difficulty of sharpening such blades in the field. As a consequence, most scrap choppers make no attempt to reduce shock and merely attempt to build sufficient strength and mass into the device to resist its damaging effects. This results in costly equipment which is needlessly massive and heavy. Moreover, since the shock is still present, maintenance is required at frequent intervals.

The present invention, by means of a novel construction, provides a scrap chopper having simple, rectilinear knives which meet at an angle to thus practically eliminate shock. Other advantages will readily become apparent from a study of the following description and from the drawings appended hereto.

Figure 2:
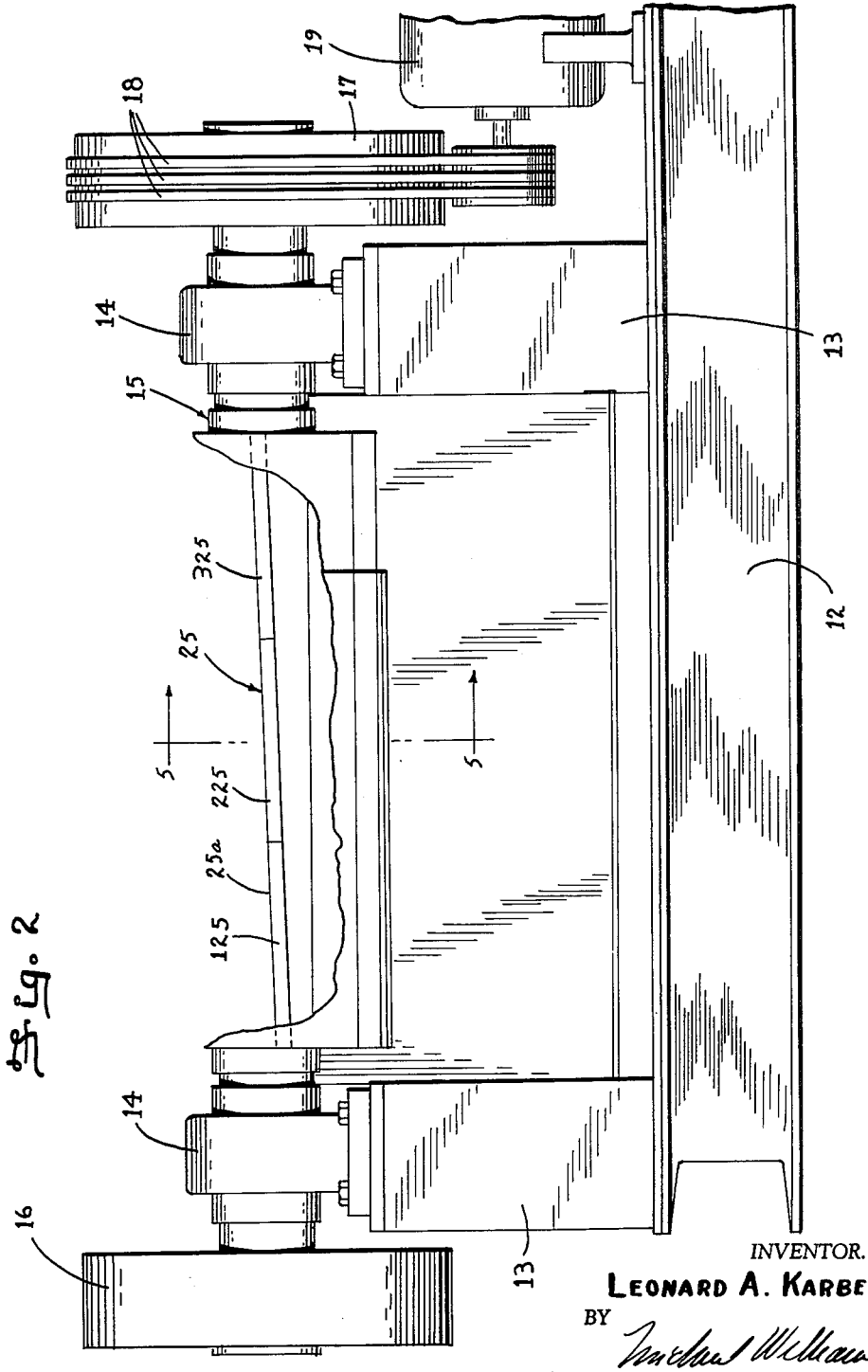
Figure 3:
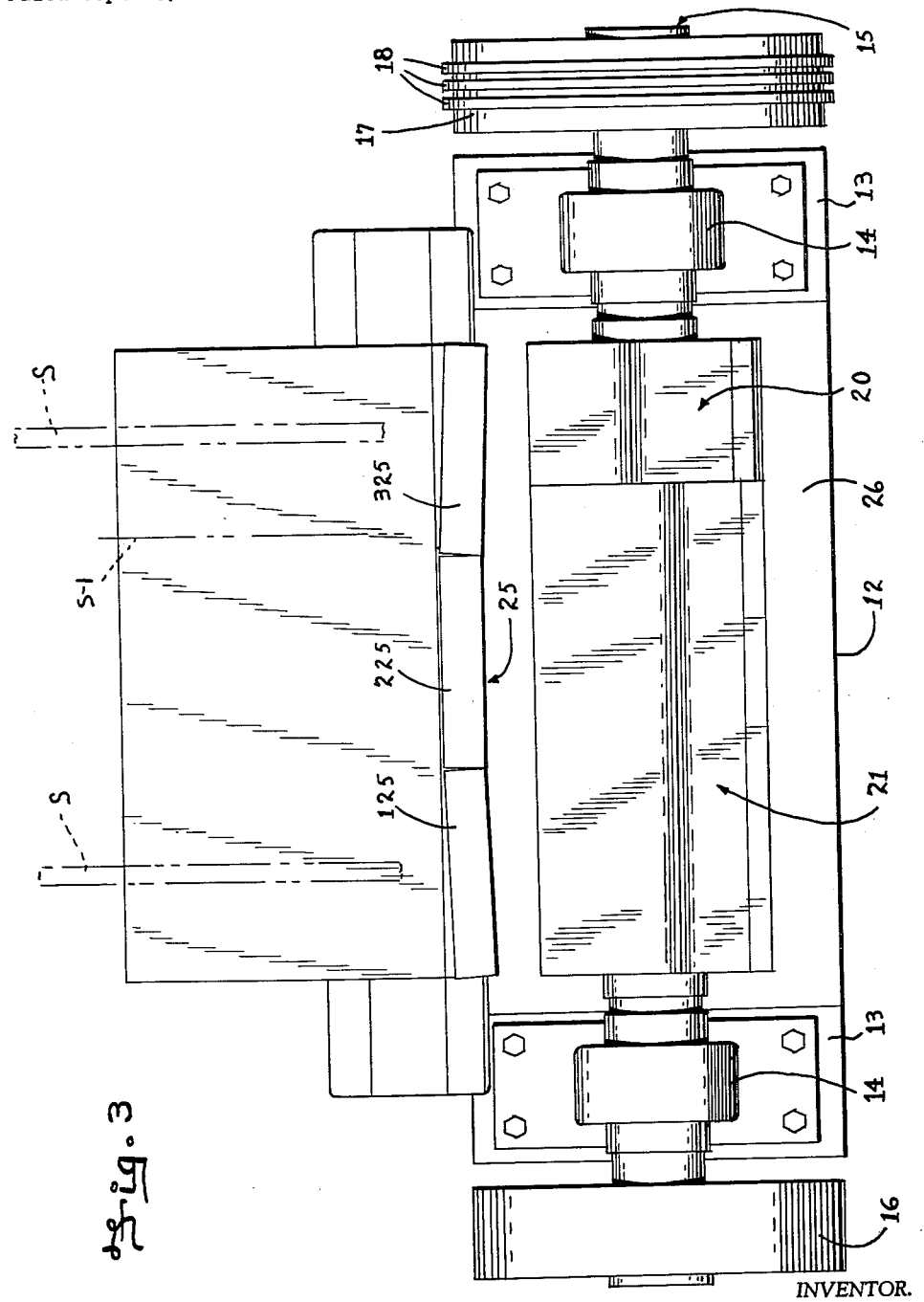

In the drawings accompanying this specification and forming a part of this application, there is shown, for purpose of illustration, an embodiment which the invention may assume, and in these drawings:

FIGURE 1 is a side elevational of a preferred embodiment of the invention, with certain parts on the near side broken away to illustrate the underlying structure, and showing the use of the invention with a conventional slitter device or the like indicated by phantom lines, FIGURE 2 is a front elevational view of the invention generally corresponding to the line 2—2 of FIGURE 1 with certain parts on the near side broken away to illustrate the underlying structure, FIGURE 3 is a top plan view of the invention, FIGURE 4 is a perspective view of a detail, and FIGURE 5 is a greatly enlarged, fragmentary sectional view generally corresponding to the line 5—5 of FIGURE 2.

With reference to FIGURE 1, 10 designates a preferred embodiment of the present invention which is herein disclosed associated with a conventional slitter apparatus 11 fragmentarily shown in phantom lines. Such slitter apparatus forms no part of the present invention; accordingly it should suffice to disclose that the slitter receives elongated strip material M, cuts the strip to a desired width by severing a relatively narrow width S from each side thereof, and thereafter passes the correctly sized strip M to any suitable apparatus (not shown) which is adapted to receive it. It is with these relatively narrow width strips of scrap S that the present invention is concerned.

As best seen in FIGURES 1, 2 and 3, the present invention comprises a base 12 providing a pair of spaced-apart, upright supports 13. Suitable bearing housings 14 are secured to the supports 13 and rotatably support an elongated arbor 15. The ends of arbor 15 project beyond respective bearing housings 14 and carry respective flywheels 16, 17 for a purpose to appear. Flywheel 17 has a plurality of annular grooves for receiving respective V belts 18 which provide a drive connection between the arbor 15 and a suitable drive motor 19 (see especially FIGURES 1 and 2) positioned beneath the flywheel 17.

Arbor 15, see FIGURES 1 and 4, has an intermediate portion providing two sets of radially projecting, longitudinally extending arms 20 and 21. The arms of each set are arranged in opposed relation with each other and for a purpose to be disclosed, respective arm sets are radially offset 90 degrees from each other. Further, in the present embodiment, arm set 21 is of considerably greater longitudinal extent than arm set 20. Removably secured to the respective arms of arm set 20 by any suitable means (not shown) are a pair of rectilinear cutting blades 22. As illustrated in FIGURE 4, blades 22 extend longitudinally of the arbor axis and in parallelism therewith. In a similar manner, a pair of rectilinear cutting blades 23 are secured to respective arms of arm set 21. As will be understood, all of the blades 22, 23 are spaced equidistant from the arbor axis.

With reference to FIGURE 1, a suitable support structure 24 extends upwardly from the base 12 and supports a fixed blade means 25 adjacent the rotatable blades 22, 23. For reasons to be disclosed, blade means 25 is formed of a plurality (herein shown to be three) of rectilinear blades 125, 225 and 325 removably secured to support structure 24 by any suitable means (not shown) in end to end relation. As will be understood, the strips of scrap S pass between the fixed blade means 25 and the rotating blades 22, 23 to be severed into short, easily handled pieces. After being severed, these small pieces will slide down a chute 26 and into a suitable container or the like (not shown).

Referring to FIGURE 3, it will be noted that the right-hand strip of scrap S will be engaged by the blades 22 while the left-hand strip of scrap will be engaged by the blades 23. Since the blades 22 are radially offset ninety degrees from the blades 23, the respective strips of scrap are cut alternately instead of simultaneously. This distributes the cutting load more evenly upon the arbor so that a single cut is made with every ninety degrees of arbor rotation instead of a double cut with each one hundred and eighty degrees of rotation thereof. This more even distribution of the cutting load, in itself, reduces cutting shock and permits the use of smaller flywheels than would otherwise be necessary to prevent widely fluctuating arbor speeds.

The reason for the difference in length between the blades 22 and the blades 23 results from the fact that regardless of the width of the material M passing through the slitter, its right-hand edge (as viewed in the position of parts seen in FIGURE 3) will nearly always occupy the same position; accordingly, the strip S slit from this edge will always be cut by the blades at the right-hand end of the arbor. However, since the material being slit may vary in width from time to time, the piece of scrap slit from the left-hand edge may be positioned adjacent the left-hand end of the arbor as shown when a wide piece of material is being slit or it may be positioned intermediate the left and right-hand arbor ends, as indicated by the line S–1, when narrower material is being slit. The blades 23, therefore, are adapted to cut the left-hand strip of scrap regardless of whether a wide or narrow width of material is being slit.

In order to reduce cutting shock and as shown in FIGURE 2, fixed blade means 25 is disposed so that its cutting edge 25a lies wholly within a plane which intersects the arbor axis at an angle. Stated another way, with the parts positioned as shown with the arbor axis horizontal, the cutting edge of blade means 25 is slightly inclined with respect to the horizontal so that its left-hand end is below the axis of the arbor and its right-hand end is above the arbor axis. Accordingly, the rotating blades 22, 23 will sweep past the blade means 25 at an angle to thus provide a "rake" to the blades which effects progressive cutting of the scrap positioned therebetween. With each piece of scrap cut progressively, the shock of cutting is greatly reduced as will readily be understood.

With the parts thus far described and as viewed in FIGURE 5, 225 indicates the position of the center of blade means 25, 125 illustrates the position of the near, or left-hand end of the blade means while 325 illustrates the position of the far, or right-hand, end of the blade means. Note that while the cutting edge 25a of blade portion 225 is shown coincident with the arcuate path of the roting blades 22, 23 (in actual practice a slight clearance would be provided) the cutting edges of the blade portions 125, 325 are spaced from such arcuate path because of the skewed position of the fixed blade means. With the cutting edges thus spaced, cutting of the scrap would, of course, be impaired.

To insure perfect contact, or more correctly, perfectly uniform clearance between the cutting edge of the fixed blade means and the rotating blades, the cutting edge of the fixed blade means would have to follow a sine curve (when viewed from above as in FIGURE 3) with the ends of the blade means curved toward the arbor axis. While such a blade would function admirably, in practise it is unsuitable for at least two reasons: Firstly, the cost of manufacturing such a blade from the hard steel of which these blades are made would be prohibitively high. Secondly, and even more important, it would be virtually impossible to regrind the edge of the blade in the field when it became dull.

Practical considerations require that the blades be rectilinear so that they may readily be resharpened in the field by the use of a conventional surface grinder or the like; accordingly, blade means 25 is presently formed of three rectilinear portions 125, 225 and 325 as hereinbefore mentioned. These portions are arranged in end to end relation; however, end portions 125 and 325 are disposed at an angle with the axis of the arbor as shown while the intermediate portion 225 is disposed parallel with the arbor axis so that the rectilinear cutting edges of respective blade portions approximate respective portions of the hereinabove mentioned, theoretical curve which the blade edge should follow for perfectly uniform clearance from end to end thereof with the rotating blades.

Concededly, the use of three rectilinear blades to approximate a curved blade results in less than perfectly uniform cutting clearance with the rotating blades. However, in the present embodiment, the maximum variation in clearance is less than one and one half thousands of an inch and this is well within the allowable tolerance in setting blade clearance with the material presently being cut. Obviously, this variation could, if desired, be reduced by employing more than three fixed blade portions. Conversely, less than three blade portions might be satisfactory under other circumstances. Clearly, the number of blade portions required will depend upon the amount that the fixed blade is skewed with respect to the axis of the arbor, the length of the cutting portion of the arbor, and the maximum allowable variation in clearance which can be tolerated without impairing cutting action.

Although not shown since it forms no part of the present invention, it will be understood that any suitable means may be employed to provide for adjusting the respective cutting blades so that proper clearance therebetween may be retained after the blades are re-ground.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A cutting device for sheet metal comprising a rotatably mounted arbor, a first blade having a rectilinear cutting edge carried by and rotatable with said arbor, and a second blade supported in fixed position adjacent said arbor and having a rectilinear cutting edge cooperable with said first blade cutting edge as said arbor is rotated to cut sheet metal interposed between said edges, one of said blades having its cutting edge tilted with respect to the rotational axis of said arbor to disposed respective ends of such cutting edge on opposite sides of said arbor axis whereby cutting action progresses from one end of said arbor to the other, one of said blades being formed of at least three relatively short blade sections each having a rectilinear cutting edge, the rectilinear cutting edge of one blade section forming a longitudinal continuation of the rectilinear cutting edge of an adjoining blade section and said sections being disposed with their cutting edges at an angle to each other for substantially equidistant spacing of each blade section cutting edge radially of the motor axis to approximate a helical cutting edge and thus provide a generally constant cutting relationship between respective blade cutting edges while employing easily sharpened blade sections each having rectilinear cutting edges.

2. The construction of claim 1 wherein the blade carried by said arbor has a cutting edge parallel to the axis of the latter and wherein it is the fixedly positioned blade which is both tilted with respect to the arbor axis and is formed of said blade sections.

References Cited in the file of this patent

UNITED STATES PATENTS

| | | |
|---|---|---|
| 1,318,892 | Maier | Oct. 14, 1919 |
| 2,242,887 | Holdgate et al. | May 20, 1941 |
| 2,399,529 | Willits | Apr. 30, 1946 |
| 2,805,715 | Novick | Sept. 10, 1957 |
| 2,814,345 | Repper | Nov. 26, 1957 |
| 2,829,693 | Jarvis | Apr. 8, 1958 |
| 2,868,253 | Kirk et al. | Jan. 13, 1959 |
| 3,000,250 | Altmann | Sept. 19, 1961 |